June 24, 1969  J. A. DOHANYOS  3,451,153
ADJUSTABLE FRAMING DEVICE
Filed May 8, 1967  Sheet 1 of 2

INVENTOR.
JOHN A. DOHANYOS
BY J. D. Douglass
His atty

June 24, 1969  J. A. DOHANYOS  3,451,153
ADJUSTABLE FRAMING DEVICE
Filed May 8, 1967  Sheet 2 of 2
Fig. 3
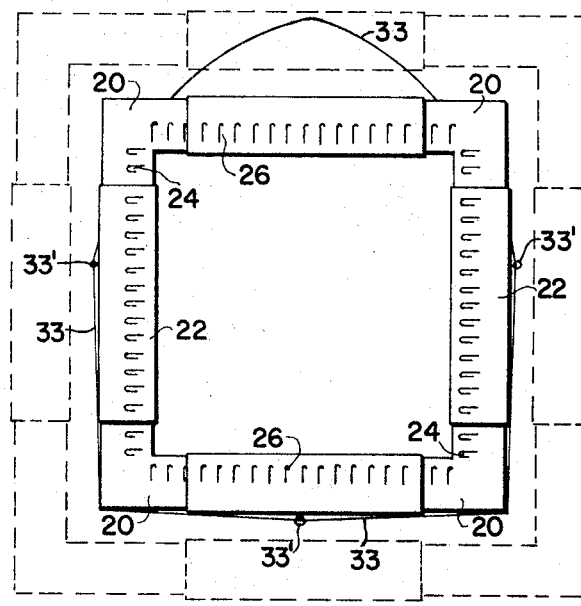
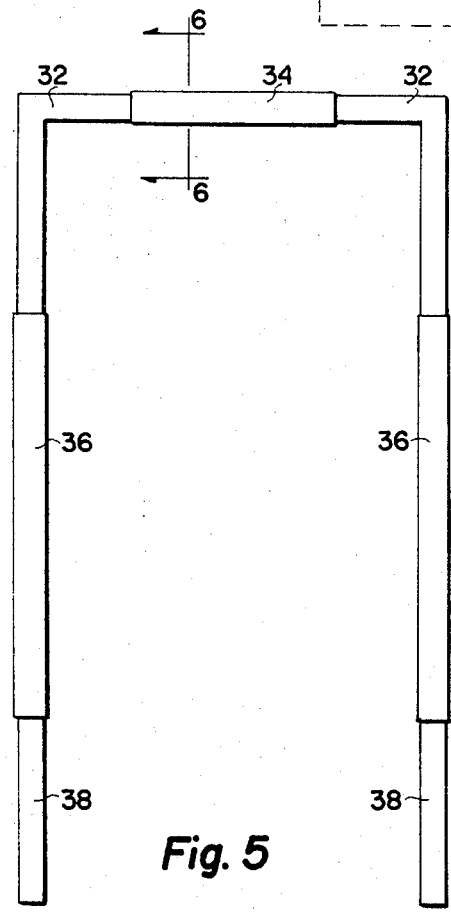
Fig. 5
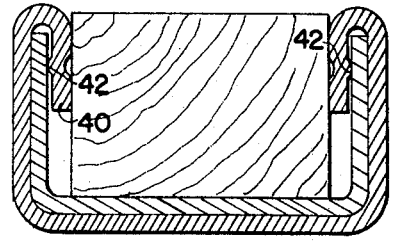
Fig. 6
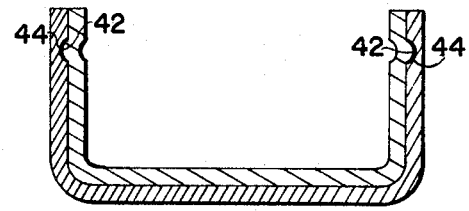
Fig. 7
INVENTOR.
JOHN A. DOHANYOS
BY J. D. Douglass
His atty.

United States Patent Office 3,451,153
Patented June 24, 1969

3,451,153
ADJUSTABLE FRAMING DEVICE
John A. Dohanyos, 2711 Vestry Ave.,
Cleveland, Ohio 44113
Filed May 8, 1967, Ser. No. 636,702
Int. Cl. G09f 1/12; E04c 2/38
U.S. Cl. 40—155                               10 Claims

ABSTRACT OF THE DISCLOSURE

An adjustable framing device having angled corner members and straight central members. Each central member telescopingly engages two corner members, one at each end. Either the central members or the corner members or both have raised projections which slidingly engage a surface of the opposite member to allow intended adjustment but prevent unintended change in size.

---

This invention relates generally, to adjustable framing members which are comprised of telescoping sections having raised projetcions in frictional contact wth opposed surfaces, so that the members can be adjusted to maintain selected positions.

The invention in one embodiment is particularly suitable for adjustable members assembled together to form a picture frame, so that a single frame can accommodate a variety of different sized pictures. The invention also finds use in providing door or window frames which can be adjusted on the site where they are being installed to fit various openings or to compensate for tolerances allowed in standard opening sizes. The members, also, can be assembled in various manners to provide other adjustable framing articles where adjustment is desirable or necessary. It is not intended that the above ennumerated uses the limiting, but rather they are illustrative of the many uses of adjustable framing members according to this invention.

In the various devices and articles noted above, adjustment is desirable since by providing adjustable articles, the number of sizes of particular articles that must be stocked can be greatly reduced, or the utility of the article can be greatly increased or improved by so providing such adjustment. However, in providing adjustable articles it is required in most cases that the members be relatively tightly secured in the various adjustable position, yet, that the members can with reasonable certainly and ease be changed to various other adjusted positions.

There have been several prior art proposals for adjustable framing members useful in certain of the above articles. These articles have suffered either from the limitation that they are difficult to adjust and maintain in the various poistions or they will be too easily moveable from the positions and not held securely enough in the desired positions.

It is therefore a principal object of this invention to provide members which can be assembled to provide adjustable framing devices wherein the members include frictional engaging raised projections to permit intended adjustment of the device but prevent unintentional movement of the device from the selected position.

Another object of this invention is to provide adjustable framing devices formed from members, which members have raised projections which frictionally engage opposed surfaces to positively hold the article in the adjusted position but, yet, permit occasional adjustment as required.

These, and other objects, together with a fuller understanding of the invention may be had with reference to the following specification and claims taken together with the accompanying drawings, in which:

FIGURE 3 is a front elevational view of another embodiment of a picture frame according to this invention;

FIGURE 5 is a front elevational view of an adjustable door frame member formed according to an embodiment of this invention;

FIGURE 6 is a sectional view taken substantially along the plane designated by the line 6 of FIGURE 5; and FIGURE 7 is a sectional view similar to FIGURE 6 of another embodiment of the adjustable frame member.

Figure 1:
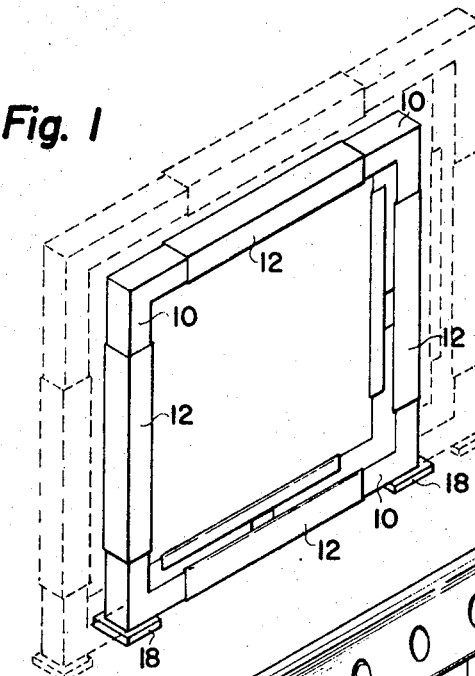
FIGURE 1 is a perspective view of an adjustable picture frame formed according to one embodiment of this invention.
Figure 2A:
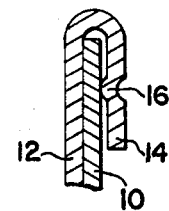
FIGURE 2a is a sectional view taken substantially along the plane of line 2a—2a of FIGURE 2.
Figure 2:
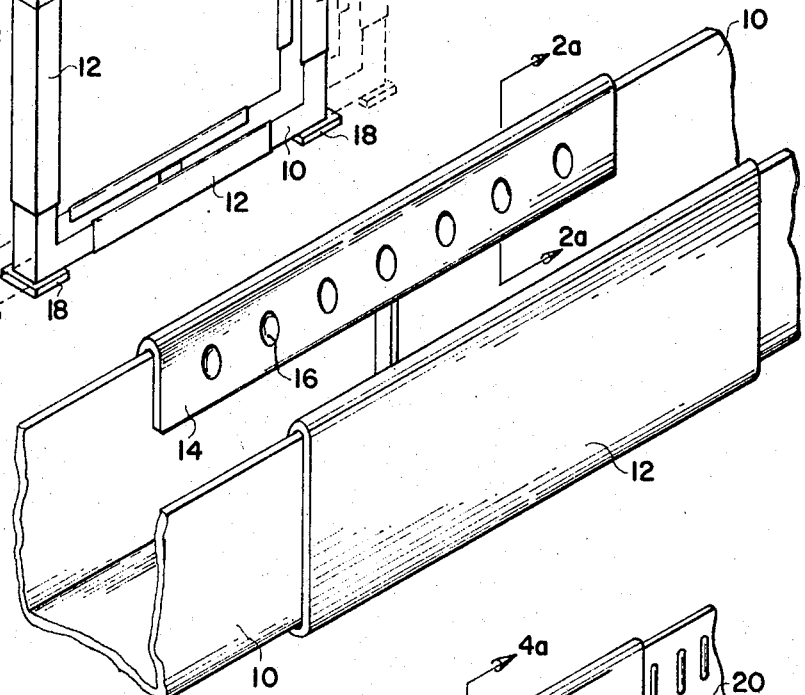
FIGURE 2 is an enlarged detailed view showing a portion of the frame of FIGURE 1.

Referring now to the drawings and, for the present to FIGURES 1 and 2, an adjustable picture frame is shown according to one embodiment of this invention. This particular embodiment of the invention is comprised of four right angle corner members 10 and four straight central members 12. Both the corner members 10 and the central members 12 are generally U shaped in cross-section and are slidably engaged in telescoping relationship. The central members 12 fit over the legs of opposite corner members 10 and each is provided with a channel forming flange 14 on each side thereof. Each of the flanges 14 are provided with raised projections 16 which extend toward the surfaces of the legs of the corner members 10 and frictionally engage these surfaces. These projections provide sufficient frictional resistance to the movement of the corner members 10 with respect to the central members 12 so that, when the frame is adjusted to any particular setting, it will remain in this setting, but the fit is not so tight that movement is completely prevented when pressure is exerted. This allows occasional or frequent adjustment, with a firm positive positioning of the members when they are adjusted to the desired positions.

The picture frame shown in FIGURES 1 and 2 is adapted to show the display pictures on both sides thereof because of the U-shaped configuration of the members 10 and 12. This type of picture frame is normally used standing on desk or table. Hence, two of the corner members 10 are provided with flat support legs 18 so that the frame may be rested on a flat surface. It is to be understood that the picture frame also can be used in commercial establishments for displaying advertising material. In such case, the same configuration of support legs 18 may be used; or, it may be desired to provide some sort of pedestal which could be secured to one of the central members 12.

In order to utilize the picture frame, the picture or other material to be framed is selected and then the members 10 and 12 are opened up so that the material may be inserted within the confines of the members 10 and 12 and the members 10 and 12 are then slidably closed together, so that they snugly secure the material to be displayed within the U-shaped members. If it is desired to protect the surface of the material, clear plastic or glass sheet may be used and cut to the desired size and also inserted within the confines of the members 10 and 12.

The frame devices of this invention, particularly one being used for displaying picture or advertising material may be formed of any of a variety of materials. For example, light or medium gage aluminum may be used and formed into the desired shape with the raised projections 16 formed therein. The members may be roll formed or extruded to the proper size, or any other metal working technique may be used which will provide the proper form for slidably inter-fitted members. Other metals, such as copper and copper alloys, steel, and many others may be used, provided they may be properly formed to the desired shape. It is also possible to use plastics to form the members 10 and 12 from molding or extruding techniques. It is understood that this is merely an illustrative list of materials and that, in fact, any material which can be formed to the proper shape and has sufficient strength to support itself and the pictures or advertising material may be used.

In the embodiment shown in FIGURES 1 and 2, the raised projections are shown in the form of a row of semi-spherical regularly arranged bosses on the flange 14 hidden within the confines of the frame. It is understood, however, that these projections may take many forms. For example, a plurality of regularly spaced ridges may be provided, such as will be described in a subsequent embodiment. Also, the raised projections may take the form of decorative embossing on the material itself, in any desired pattern. When such decorative embossing is used, the projections need not be hidden within the confines of the frame itself; but, may in fact be over the total surface area of the central member 12 to provide a decorative effect. It is also possible that the projections could be formed on the corner members 10, either in place of being formed on the central member 12 or in addition to being formed on the central member 12. This is particularly true where an embossed pattern material is utilized for forming.

Sometimes it is desirable to minimize the appearance of the break between the central members 12 and the corner members 10. This can be done either by providing a ridge pattern with the ridges running parallel to the edge of the transition between the central and corner members, or alternatively the central members 12 can be beveled at their outer edges, or even some type of medallion or other cover piece could be provided at each of the edges where the central member 12 joins with the corner members 10.

It is also possible to provide the central members 12 with colors or features that contrast with the color or feature of members 10 to accentuate the difference and provide a decorative effect. By stocking just a few variations of colors and designs, a wide range of combinations is possible. Various colors and designs of corner pieces 10 and central pieces 12 can be stocked in unassembled relationship. The person purchasing the frame can then select either similar color and pattern material for the corner members and central members so that the frame will have a similar, over-all effect, or contrasting members can be selected and assembled to provide a contrasting effect. An extremely large variety of combinations thus becomes possible with a minimum number of units being kept in stock to provide this wide variety of contrast. This allows in essence a custom designed frame to be selected by the purchaser according to his own taste by assembling them as the customer desires. It also allows the customer to select very few corner and central members and with these few additional members be able to construct numerous variety of frames which can be changed regularly and frequently to give desired effects. This ability to change or remain constant provides a great advantage for commercial users where one may select various combinations to attract attention to new advertising, or may use certain particular color or pattern combinations for certain lines of advertising without having to buy completely new patterns or frames for each change.

This feature of a frame being assembled from several stock parts is particularly desirable to commercial users for an additional reason. If one section of the frame is damaged the entire frame need not be discarded but merely this particular section. This greatly reduces maintenance cost of the frames for industrial and commercial users and allows quick repair and replacement without carrying a large inventory of different size frames. It is readily apparent that in the simplest case a commercial user could carry in stock one single size and pattern type of corner piece, and one single pattern central piece and in sufficient quantity to provide signs having extremely wide range of use. By merely adding one additional pattern end piece and central piece it is possible to have four entirely different sign appearances, each adjustable to accommodate a great number of different sizes of material.

Figure 4A:
FIGURE 4a is a sectional view taken substantially along the plane of line 4a—4a of FIGURE 4.
Figure 4:
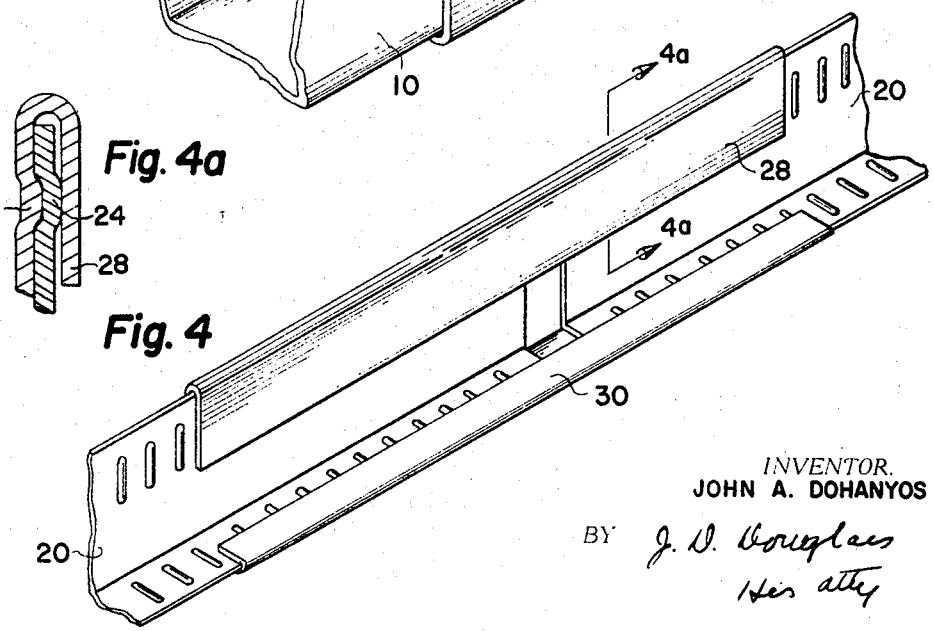
FIGURE 4 is an enlarged detailed view of the frame of FIGURE 3.

Referring now to FIGURES 3 and 4, another embodiment of a picture frame device, adjustable according to this invention is shown. In this embodiment, a conventional, wall-type hanging frame is shown which is adjustable according to this invention. The frame, in this case, also contains four right angle corner members and four central members 22. Each of the central members 22 is telescoped over the legs of opposite corner members 20. In this embodiment, however, as can be seen in FIGURE 4, the members are generally L shaped in cross sections and thus adapted to display the picture or other display material facing only one way. This embodiment is shown with members 20 and 22 both having raised projections in form of a plurality of aligned spaced ribs 24. In this embodiment, the ribs are provided on the outwardly facing portion of the members 20 and 22 so as to provide a decorative effect to the member. Thus, in this case the projecting members 24, in addition to serving as frictional holding means also serve as a decorative feature on the front of the frame itself. Also, the raised portions of the ribs 24 on the corner members 20 lock or inter-fit into the grooves formed on the rear side of the raised portions of ribs 26 formed on the central member 22 as can be seen in FIG. 4a. Thus, in this case, the ribs 24 and 26 actually provide interlocking, or interfitting lock means which positively and firmly hold the picture frame at its desired adjusted position. Suitable raised ears or other means (not shown) may be provided to hold the picture in the frame and keep it from falling out of the back.

In this embodiment it is not necessary for the flanges 28 and 30 defining the channels in which the legs of the corner members 20 slide to be provided with raised projections, although, if it is convenient to manufacture the central members 22 with such projections it is possible to also have the projections on flanges, too.

The same various combinations of different or similar patterns of central and corner members can also be formed with this hanging type frame as can be formed with the frame shown in FIGURES 1 and 2. Also, of course, the various material can be used to form this type of frame and various types of raised projections can be used.

The frictional resistance to moving offered by the various designs of raised projections normally is sufficient to resist any tendency of the frame to open or spread when hung on the wall. However, if exceedingly heavy material is to be enclosed or displayed in the frame, it may be desirable to support the frame on the bottom with cord 33 passing under the frame and through eyes 33'.

These framing members of FIGURES 1 through 4 are not confined in their use as picture frames but have many other uses. For example, but not by way of limitation, they may be used as shadow box frames.

Referring now to FIGURES 5 and 6, an adjustable door framing member is shown. For the door framing member, a pair of angled corner members 32 are provided, each of which are telescopingly slidably engaged in an upper-central member 34 and a side central member 36. Preferably, a pair of lower side members 38 are provided, each of which telescopingly engages the central side members 36. In this embodiment, the members are all U shaped, with the opening facing outwardly, as can be seen in FIGURE 6. The central members 34 and 36 are each provided with a return, or bent under flange 40, which has raised projections 42 abutting against the surface of the corner members 32 or the lower members 38. This provides the frictional engagement so that when adjustment has been made it will be maintained, but when sufficient force is applied this frictional holding power can be overcome and the framing member adjusted to the proper size.

This adjustable feature of door framing members allows for minor adjustments of the framing member when it is installed so that minor variations in the opening provided can be tolerated. This adjustable feature also provides for the stocking of three and only three parts to provide door frames of a great variety of sizes of doors.

Another feature of this adjustable slidably engaged framing member is its ability to compensate for expansion and contraction due to temperature changes. Because of the sliding interfit construction a built in expansion and contraction capability is provided so that the frame will not pull lose from its mountings when it is mounted to an opening irrespective of drastic temperature changes. When the corner members 32 are anchored and the lower members 38 are similarly anchored, a rise and fall in temperature will not cause a shrinkage or expansion of the entire frame inwardly or outwardly, but rather will allow these different members to expand or contract in sliding engagement with the members 34 and 36 so the expansion and contraction is compensated for within the framework itself and the framework itself will not change size. This is a great advantage, particularly in climates where there are extremes of temperature.

Referring now to FIGURES 7, a modification of the upper central member 34 and side central members 36 as shown, wherein there is no return flange and wherein the raised projections are provided on the corner members 32 and the lower members 38. This construction may be more desirable when the members 32, 34, 36 and 38 are made of heavy gauge material which is not easily deformable. In this case there are a plurality of projections 42 and preferably a series of indentations 44 formed into which the projections 42 may fit. This provides a lock similar to that provided with the ribs in the embodiment of the picture frame in FIGURES 3 and 4. This type of construction shown in FIGURE 7 is desirable, however, only where the gauge of the material is heavy enough to prevent the deformation of the legs of the U-shaped members which would eventually result in loss of frictional holding power. This type of construction, therefore, is not normally useful in the case of some picture frames, i.e., those made of lighter gauge material.

The same general type of construction as shown for framing can be utilized for window framing members with the same effect. In the case of window framing the lower members 38 may be replaced with members similar to corner members 32 and a lower central member similar to the upper member 34 is provided to give a complete enclosure.

Although one embodiment of this invention has been shown and described various adaptations and modifications may be made without departing from the scope of the appended claims.

What is claimed is:
1. An adjustable framing device comprising a plurality of corner members and a plurality of straight central members, said corner members and said central members being formed with mating cross sectional configurations, said central members and said corner members being arranged in telescoping relationship to define a generally rectangular shape, each of said central members engaging a corner member at each end thereof, said corner members having first integral surface means, said central members having second integral surface means positioned to face said first surface means, at least one of said surface means having raised projection detent means thereon projecting against the other surface means in sliding frictional engagement therewith, providing slidable frictional retention against unintended movement of the members.

2. The framing device of claim 1 wherein there are four right angle corner members and four central members to define a nenclosed rectangular area.

3. The framing device of claim 1 wherein said central members have flange means defining a channel slidably engaging said corner members.

4. The framing device of claim 3 wherein said projection means are provided on said flange means.

5. The framing device of claim 1, wherein said projection means are provided on exposed surfaces of said members.

6. The framing device of claim 1, wherein said surface means opposite said projection means includes depressions disposed to slidably engage said raised projection means.

7. The framing device of claim 1 wherein said sections are each generally L shaped in cross sections.

8. The framing device of claim 1 wherein each of said sections is generally U shaped in cross sections.

9. The framing device of claim 1 further characterized by support means carried by at least one of said members and disposed to provide support for said framing device on a flat surface.

10. The framing device of claim 1 further characterized by cord means secured thereto and running on the underside of the frame device in its normally hanging position whereby to provide underlying support for said frame member.

References Cited

UNITED STATES PATENTS

| | | | |
|---|---|---|---|
| 838,816 | 12/1906 | Sherwood | 40—155 |
| 2,078,744 | 4/1937 | Tursky | 40—155 |
| 2,292,999 | 8/1942 | Heren | 40—209 |
| 2,581,843 | 1/1952 | Edwards | 40—155 |
| 3,023,525 | 3/1962 | Cointreau | 40—155 |

EUGENE R. CAPOZIO, *Primary Examiner.*

W. J. CONTRERAS, *Assistant Examiner.*

U.S. Cl. X.R.

52—656